United States Patent
Igarashi et al.

(10) Patent No.: US 9,852,633 B2
(45) Date of Patent: Dec. 26, 2017

(54) TRAVEL ASSIST APPARATUS AND TRAVEL ASSIST METHOD

(75) Inventors: Shinji Igarashi, Susono (JP);
Tomonori Akiyama, Susono (JP); Yuki Yoshihama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 308 days.

(21) Appl. No.: 13/982,568

(22) PCT Filed: Feb. 28, 2011

(86) PCT No.: PCT/JP2011/054536
§ 371 (c)(1),
(2), (4) Date: Jul. 30, 2013

(87) PCT Pub. No.: WO2012/117505
PCT Pub. Date: Sep. 7, 2012

(65) Prior Publication Data
US 2013/0321172 A1    Dec. 5, 2013

(51) Int. Cl.
G08G 1/09       (2006.01)
G08G 1/16       (2006.01)
B60W 30/095   (2012.01)
B60W 30/12     (2006.01)

(52) U.S. Cl.
CPC ......... *G08G 1/166* (2013.01); *B60W 30/0956* (2013.01); *G08G 1/167* (2013.01); *B60W 30/12* (2013.01); *B60W 2550/30* (2013.01)

(58) Field of Classification Search
CPC ......... B60W 30/0956; B60W 2550/30; B60W 30/12; G08G 1/166; G08G 1/167
See application file for complete search history.

(56) References Cited

U.S. PATENT DOCUMENTS

| 6,269,308 B1 * | 7/2001 | Kodaka | B62D 15/0265 |
| | | | 340/435 |
| 6,272,418 B1 * | 8/2001 | Shinmura | B60T 7/22 |
| | | | 303/146 |
| 8,706,353 B2 * | 4/2014 | Kawai | B62D 6/00 |
| | | | 701/41 |

(Continued)

FOREIGN PATENT DOCUMENTS

| JP | A-2000-62555 | 2/2000 |
| JP | A-2006-143052 | 6/2006 |

(Continued)

*Primary Examiner* — Quang D Pham
(74) *Attorney, Agent, or Firm* — Oliff PLC

(57) ABSTRACT

The present invention resides in a travel assist apparatus that performs assist of warning or support so that departure of a vehicle from a traveling lane is avoided, wherein a timing to the assist is to be performed is changed depending on a lane entering angle of an oncoming vehicle and a lane departure angle of a subject vehicle with respect to the traveling lane. Accordingly, the timing at which the assist is to be performed is changed depending on the lane entering angle of the oncoming vehicle and the lane departure angle of the subject vehicle with respect to the traveling lane. Therefore, it is possible to advance the timing at which the assist is to be performed as the possibilities is higher that the behaviors of the oncoming vehicle and the subject vehicle hinder the traveling of the subject vehicle.

6 Claims, 9 Drawing Sheets

(56) References Cited

U.S. PATENT DOCUMENTS

| | | | |
|---|---|---|---|
| 8,712,640 B2* | 4/2014 | Kawakami | B62D 6/00 180/271 |
| 8,849,514 B2* | 9/2014 | Sugawara | B60T 7/042 303/146 |
| 9,056,630 B2* | 6/2015 | Han | B62D 15/029 |
| 9,108,664 B2* | 8/2015 | Lee | G08G 1/167 |
| 9,505,401 B2* | 11/2016 | Akiyama | B60W 10/184 |
| 2001/0016798 A1 | 8/2001 | Kodaka et al. | |
| 2001/0018641 A1 | 8/2001 | Kodaka et al. | |
| 2005/0273261 A1* | 12/2005 | Niwa | B62D 15/029 701/301 |
| 2006/0095195 A1* | 5/2006 | Nishimura | B60W 30/025 701/96 |
| 2006/0111842 A1* | 5/2006 | Sugimoto | G08G 1/167 701/301 |
| 2006/0132295 A1* | 6/2006 | Gern | B60Q 9/008 340/438 |
| 2006/0142922 A1* | 6/2006 | Ozaki | B60T 8/17557 701/70 |
| 2007/0225914 A1* | 9/2007 | Kawazoe | B62D 15/025 701/301 |
| 2008/0238718 A1* | 10/2008 | Jung | B62D 15/025 340/901 |
| 2010/0259617 A1* | 10/2010 | Kawasaki | G06K 9/00798 348/148 |
| 2010/0292888 A1* | 11/2010 | Taguchi | B60W 10/06 701/31.4 |
| 2011/0015850 A1* | 1/2011 | Tange | B60W 30/12 701/116 |
| 2011/0063131 A1* | 3/2011 | Toledo | B62D 15/0285 340/932.2 |
| 2011/0068953 A1* | 3/2011 | Toledo | B62D 15/0285 340/932.2 |
| 2011/0082613 A1* | 4/2011 | Oetiker | B60W 10/20 701/25 |
| 2012/0215377 A1* | 8/2012 | Takemura | B60W 30/12 701/1 |
| 2013/0190982 A1* | 7/2013 | Nakano | B62D 6/00 701/41 |
| 2013/0190983 A1* | 7/2013 | Tatsukawa | B62D 6/00 701/41 |
| 2013/0190984 A1* | 7/2013 | Kawai | B62D 15/025 701/41 |
| 2013/0190985 A1* | 7/2013 | Nakano | B62D 6/00 701/41 |
| 2013/0226409 A1* | 8/2013 | Akiyama | B60W 10/184 701/41 |
| 2015/0336510 A1* | 11/2015 | Imai | G08G 1/167 348/148 |
| 2016/0091325 A1* | 3/2016 | Takamatsu | G08G 1/167 701/408 |

FOREIGN PATENT DOCUMENTS

| | | |
|---|---|---|
| JP | A-2006-298294 | 11/2006 |
| JP | A-2009-96361 | 5/2009 |
| JP | A-2010-83314 | 4/2010 |
| JP | A-2011-3075 | 1/2011 |

* cited by examiner

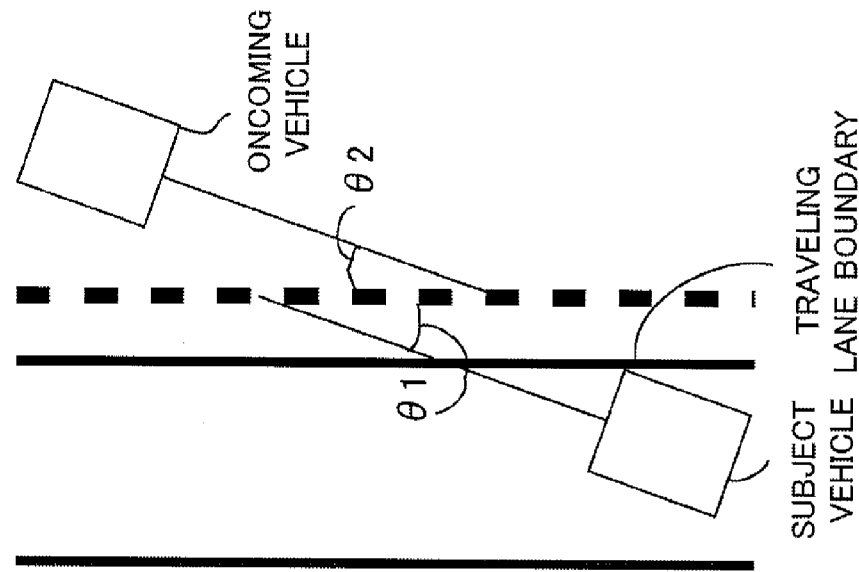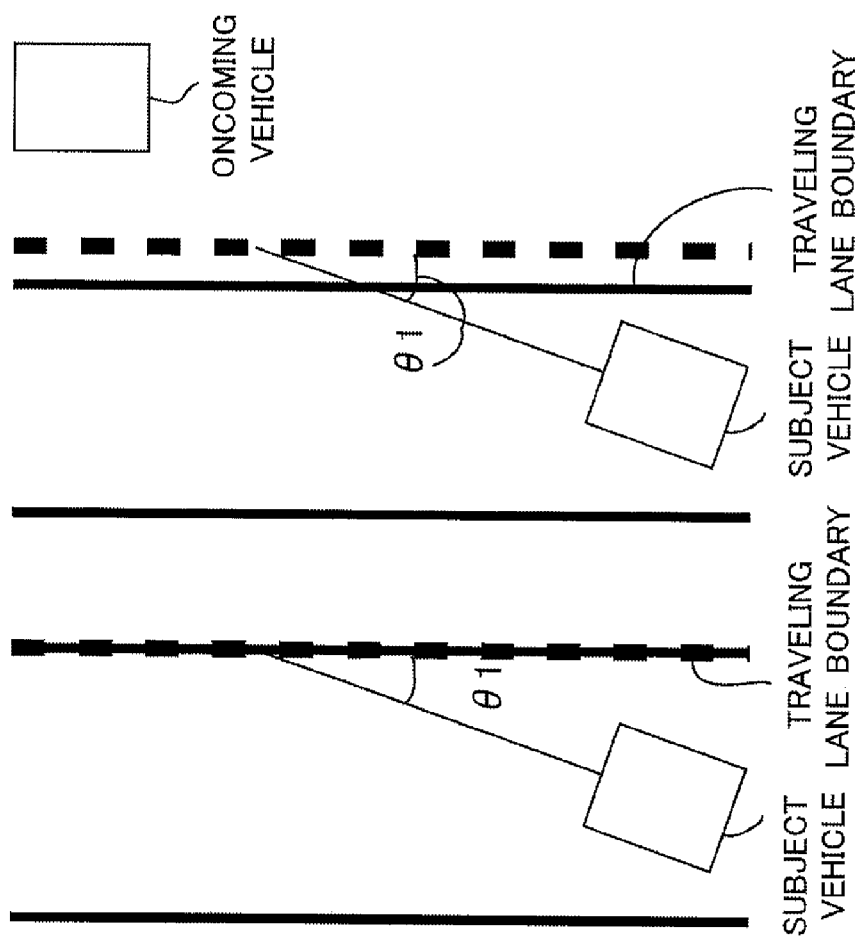
Fig.5A  Fig.5B  Fig.5C

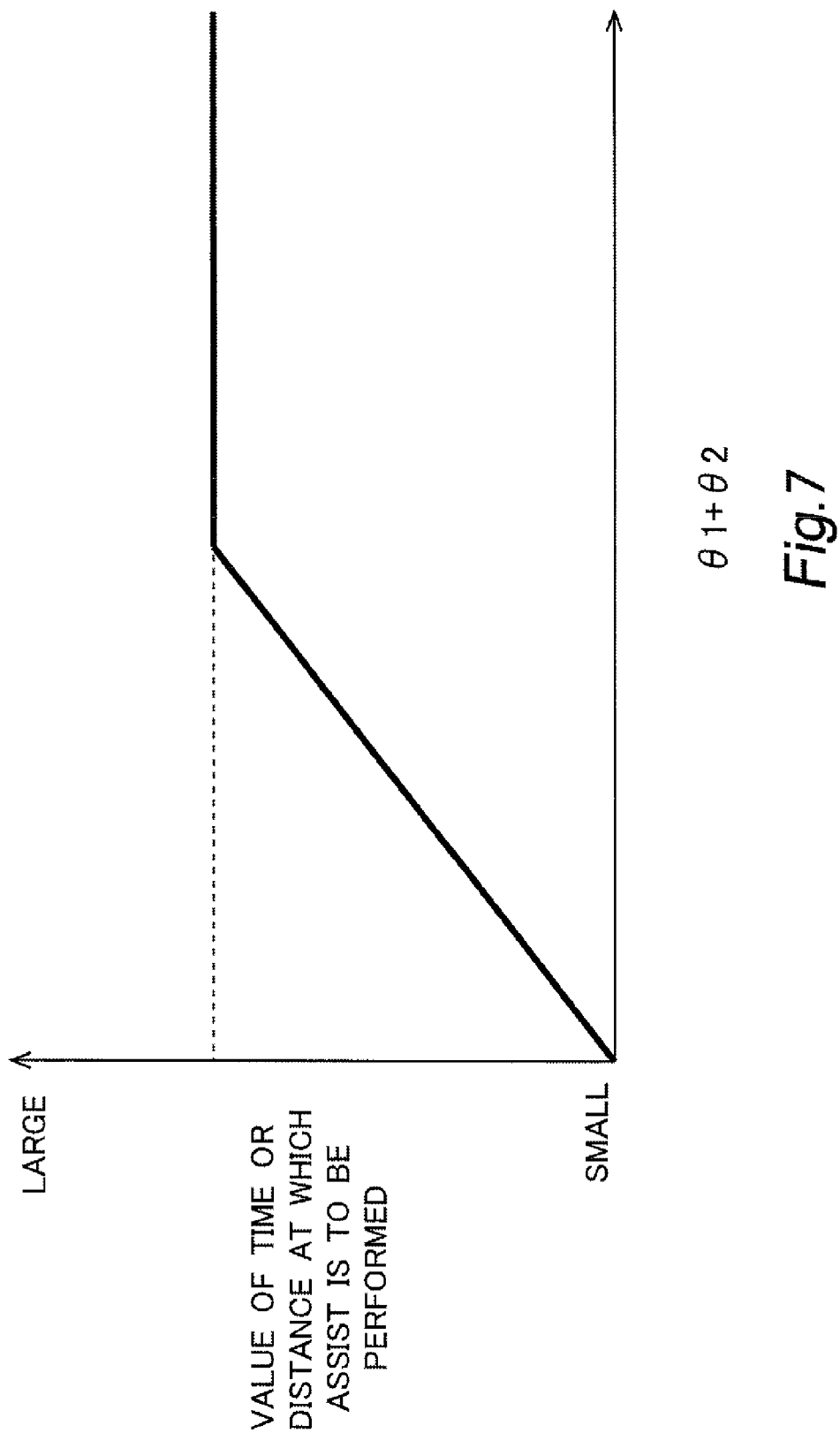

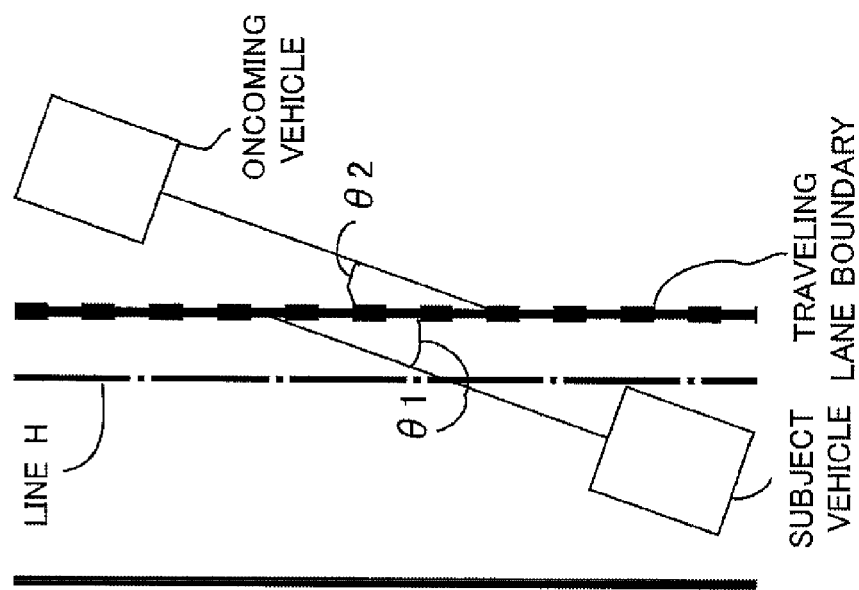
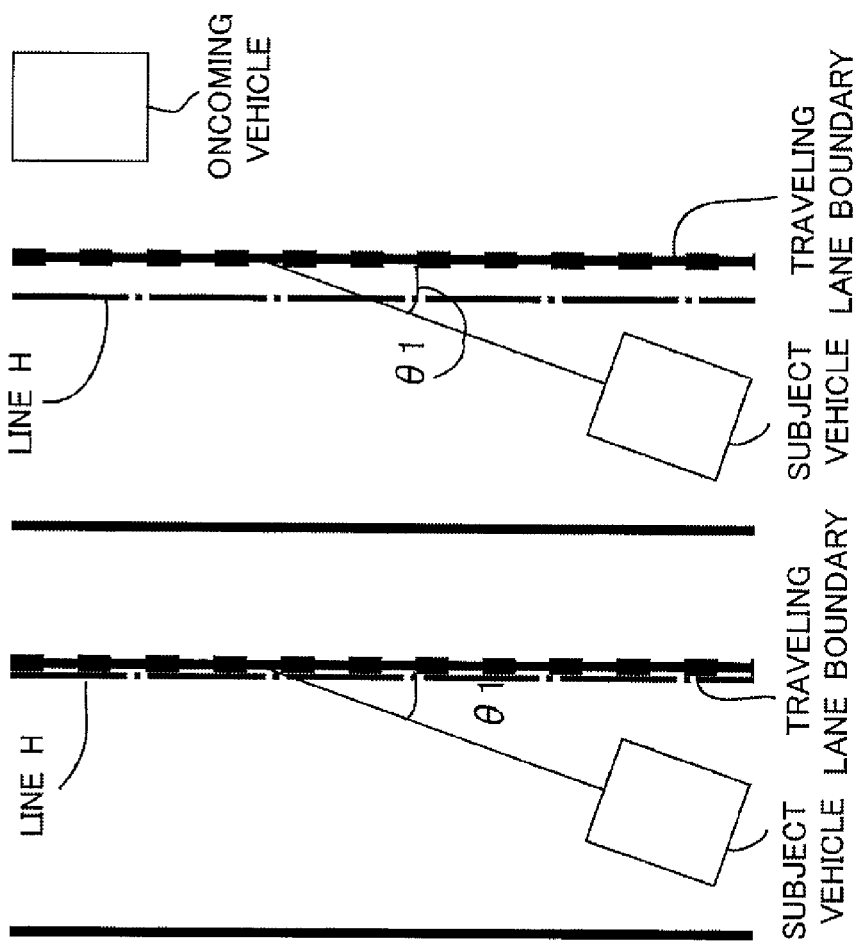
Fig.8A  Fig.8B  Fig.8C

TRAVEL ASSIST APPARATUS AND TRAVEL ASSIST METHOD

TECHNICAL FIELD

The present invention relates to a travel assist apparatus and a travel assist method.

BACKGROUND ART

A technique has been disclosed, wherein the drive assist control, which includes, for example, the alarm output, the forcible braking, and the avoidance steering, is executed if it is determined that another vehicle (object vehicle) may protrude to a cruising lane of a subject vehicle and there is some possibly of causing collision when the object vehicle intends to turn to a road on which the subject vehicle travels, from an intersecting road (see, for example, Patent Document 1).

CITATION LIST

Patent Literature

PTL 1: Japanese Patent Application Laid-Open No. 2010-083314A;
PTL 2: Japanese Patent Application Laid-Open No. 2006-143052A;
PTL 3: Japanese Patent Application Laid-Open No. 2000-062555A;
PTL 4: Japanese Patent Application Laid-Open No. 2009-096361A.

SUMMARY OF INVENTION

Technical Problem

However, the situation, in which the object vehicle hinders the traveling of the subject vehicle, is not limited to the situation in which the object vehicle enters from the intersecting road as referred to in Patent Document described above. When a subject vehicle ordinarily travels, there is also such a possibility that the traveling of the subject vehicle may be hindered by an oncoming vehicle due to any sudden or unforeseen entry of the oncoming vehicle into the traveling direction of the subject vehicle.

The present invention has been made taking the foregoing circumstances into consideration, an object of which is to provide a technique wherein the assist of warning or support is performed in response to a behavior of an oncoming vehicle when a subject vehicle ordinarily travels.

Solutions to Problem

The present invention adopts the following construction. That is, the present invention resides in a travel assist apparatus that performs assist of warning or support so that departure of a vehicle from a traveling lane is avoided, the traveling lane being set on the basis of a non-travelable area or a road marking to indicate a lane boundary, wherein:

a timing at which the assist is to be performed is changed depending on a lane entering angle of an oncoming vehicle with respect to the traveling lane.

The road marking (road indication), which indicates the lane boundary, is exemplified, for example, by the median strip and the partition between lanes including, for example, lines such as white lines, yellow lines, dotted lines and the like, road studs, and light emitting objects on the road surface, and the boundary (partition line) between the roadway and those other than the roadway including, for example, boundaries between asphalt and gravel. The non-travelable area is exemplified by the obstacle including, for example, guard rails, fences, side walls, curbstone, walkers, bicycles, and other vehicles, and the region or area in which any difference in height is present with respect to the traveling flat surface for allowing the vehicle to travel, including, for example, gutters, recesses, and steps. The non-travelable area includes the region in which it is intended not to allow the vehicle to travel and the region in which the traveling of the vehicle is not preferred, in addition to the region in which the vehicle cannot travel.

The oncoming vehicle is the vehicle which travels in the direction opposite to that of the subject vehicle, on the opposite lane (opposing lane) of the same road as that of the subject vehicle. The lane entering angle of the oncoming vehicle with respect to the traveling lane is the acute angle which is formed by the extending direction of the traveling lane and the traveling direction of the oncoming vehicle. The lane departure angle of the subject vehicle with respect to the traveling lane is the acute angle which is formed by the extending direction of the traveling lane and the traveling direction of the subject vehicle. The timing at which the assist is to be performed is the timing at which the vehicle actually carries out the assist of the warning or the support.

According to the present invention, the timing at which the assist is to be performed is changed depending on the lane entering angle of the oncoming vehicle with respect to the traveling lane (driving lane or driving track). Therefore, the timing at which the assist is to be performed can be advanced as the possibility is higher that the behavior of the oncoming vehicle hinders the traveling of the subject vehicle. In this way, it is possible to perform the assist of the warning or the support in response to the behavior of the oncoming vehicle during the ordinary traveling of the subject vehicle.

It is preferable that the timing at which the assist is to be performed is changed depending on a lane departure angle of a subject vehicle with respect to the traveling lane, in addition to the lane entering angle of the oncoming vehicle with respect to the traveling lane.

According to the present invention, the timing at which the assist is to be performed is changed depending on the lane departure angle of the subject vehicle with respect to the traveling lane in addition to the lane entering angle of the oncoming vehicle with respect to the traveling lane. Therefore, the timing at which the assist is to be performed can be advanced as the possibility is higher that the behaviors of the oncoming vehicle and the subject vehicle hinder the traveling of the subject vehicle. In this way, it is possible to perform the assist of the warning or the support in response to the behaviors of the oncoming vehicle and the subject vehicle during the ordinary traveling of the subject vehicle.

It is preferable that the timing at which the assist is to be performed is changed by changing a boundary position of the traveling lane.

According to the present invention, the timing at which the assist is to be performed can be changed by changing the boundary position of the traveling lane. For example, it is preferable that the timing at which the assist is to be performed is advanced by setting the boundary position of the traveling lane nearer to the subject vehicle as the lane entering angle of the oncoming vehicle with respect to the traveling lane and the lane departure angle of the subject vehicle with respect to the traveling lane increase.

It is preferable that the timing at which the assist is to be performed is changed by changing a value of a time or distance to lane crossing until the departure of the vehicle from the traveling lane boundary wherein the assist is to be performed at the timing when the time or distance arrives at the value.

According to the present invention, the timing at which the assist is to be performed can be changed by changing a value (threshold value) of a time (an estimated time) or a distance (an estimated distance) to lane crossing until the departure of the vehicle from the traveling lane boundary wherein the assist is to be performed at the timing when the time or distance arrives at the value. For example, it is preferable that the value of a time or distance to lane crossing until the departure of the vehicle from the traveling lane boundary wherein the assist is to be performed at the timing when the time or distance arrives at the value, is increased to advance the timing at which the assist is to be performed, as the lane entering angle of the oncoming vehicle with respect to the traveling lane and the lane departure angle of the subject vehicle with respect to the traveling lane increase.

The present invention adopts the following construction. That is, the present invention resides in a travel assist method for performing assist of warning or support so that departure of a vehicle from a traveling lane is avoided, the traveling lane being set on the basis of a non-travelable area or a road marking to indicate a lane boundary, wherein:

a timing at which the assist is to be performed is changed depending on a lane entering angle of an oncoming vehicle with respect to the traveling lane.

According to the present invention, it is also possible to perform the assist of the warning or the support in response to the behavior of the oncoming vehicle during the ordinary traveling of the subject vehicle.

Advantageous Effects of Invention

According to the present invention, it is possible to perform the assist of the warning or the support in response to the behavior of the oncoming vehicle during the ordinary traveling of the subject vehicle.

BRIEF DESCRIPTION OF DRAWINGS

FIG. 5A to 5C show the boundary position of the traveling lane set on the basis of the difference in the magnitude of ($\theta 1+\theta 2$) according to the first embodiment.

FIG. 7 shows a relationship between ($\theta 1+\theta 2$) and the value of the time and distance at which assist is to be performed according to a second embodiment.

FIG. 8A to 8C show the line H corresponding to the value of the time and/or distance at which assist is to be performed set on the basis of the difference in the magnitude of ($\theta 1+\theta 2$) according to the second embodiment.

DESCRIPTION OF EMBODIMENTS

A specified embodiment of the present invention will be explained below. An explanation will now be made about a drive assist apparatus (driving support apparatus, for example, LDW, LDP or the like) which recognizes the traffic lane and the non-travelable area, which sets the traveling lane on the basis of the recognized traffic lane and the non-travelable area, and which performs the drive assist process in order to avoid the departure of a subject vehicle from the traveling lane. The drive assist process referred to herein is executed earlier than the collision damage mitigating process which is executed when the vehicle is subjected to the emergency stop and when the collision between a vehicle and an obstacle is inevitable, wherein the assist is performed so that the traveling itself can be continued. Therefore, the drive assist apparatus of the present invention is different from a certain drive assist apparatus (for example, PCS or the like) which performs the collision damage mitigating process. The construction, which is explained in the following embodiment, represents a mode for carrying out the present invention, which does not limit the construction of the present invention.

First Embodiment (Drive Assist Apparatus)

Figure 1:
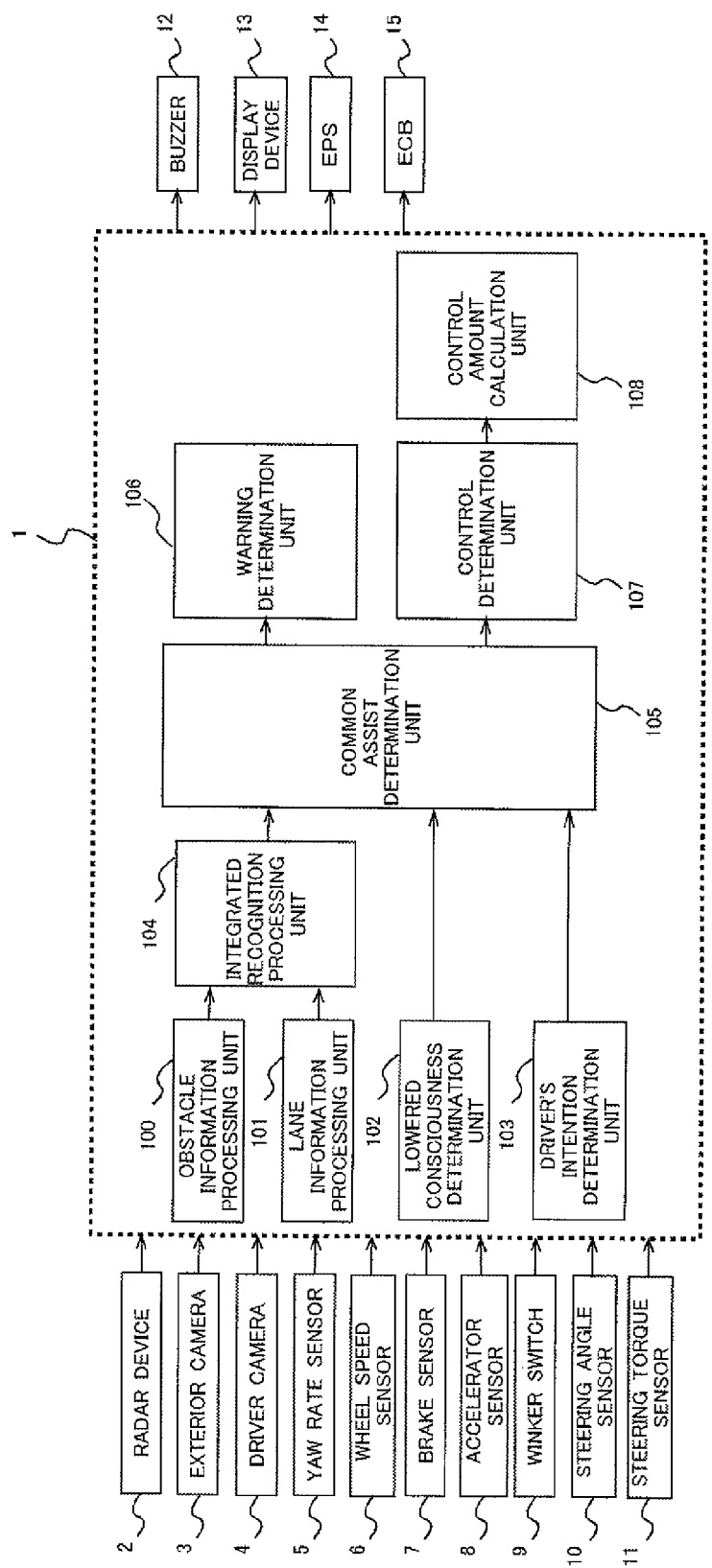
FIG. 1 shows a block diagram illustrating the construction of a drive assist apparatus according to a first embodiment of the present invention while being classified into distinct functions.

FIG. 1 shows a block diagram illustrating the construction of a drive assist apparatus (driving support apparatus) according to a first embodiment of the present invention while being classified into distinct functions. As shown in FIG. 1, an electronic control unit (ECU) 1 for assisting the driving, which constructs the drive assist apparatus, is carried on a vehicle.

ECU 1 is the electronic control unit which is provided with, for example, CPU, ROM, RAM, backup RAM, and an I/O interface. Those electrically connected to ECU 1 are various sensors including, for example, a radar device 2, a vehicle exterior camera 3, a driver camera 4, a yaw rate sensor 5, a wheel speed sensor 6, a brake sensor 7, an accelerator sensor 8, a winker switch 9, a steering angle sensor 10, and a steering torque sensor 11. Output signals of the sensors are inputted into ECU 1.

The radar device 2 is attached to a front portion of the vehicle, wherein a millimeter wave is transmitted forwardly from the vehicle and the reflected wave, which is reflected by an obstacle disposed outside the vehicle, is received. Accordingly, the radar device 2 outputs the information (for example, coordinate information) in relation to the relative position of the obstacle with respect to the vehicle. The vehicle exterior camera 3 is arranged at a position at which those existing in front of the vehicle can be captured in the field of view in the vehicle cabin, and the vehicle exterior camera 3 outputs an image of those existing in front of the vehicle. The driver camera 4 is arranged at a position at which the driver can be captured in the field of view in the vehicle cabin, and the driver camera 4 outputs an image of the driver. The yaw rate sensor 5 is attached to a vehicle body, and the yaw rate sensor 5 outputs an electric signal correlated with the yaw rate of the vehicle. The wheel speed sensor 6 is attached to a wheel of the vehicle, and the wheel speed sensor 6 outputs an electric signal correlated with the travel velocity of the vehicle.

The brake sensor 7 is attached to a brake pedal in the vehicle cabin, and the brake sensor 7 outputs an electric signal correlated with the operation torque (pedaling force) of the brake pedal. The accelerator sensor 8 is attached to an accelerator pedal in the vehicle cabin, and the accelerator sensor 8 outputs an electric signal correlated with the operation torque (pedaling force) of the accelerator pedal. The winker switch 9 is attached to a winker lever in the vehicle cabin, and the winker switch 9 outputs an electric signal correlated with the direction indicated by the winker (direction indicator) when the winker lever is operated. The steering angle sensor 10 is attached to a steering rod connected to a steering wheel in the vehicle cabin, and the steering angle sensor 10 outputs an electric signal correlated with the angle of rotation of the steering wheel from the neutral position. The steering torque sensor 11 is attached to the steering rod, and the steering torque sensor 11 outputs an electric signal correlated with the torque (steering torque) inputted into the steering wheel.

Further, various devices and systems including, for example, a buzzer 12, a display device 13, an electric power steering (EPS) 14, and an electronically controlled brake (ECB) system 15 are connected to ECU 1, and the various devices and systems are electrically controlled by ECU 1.

The buzzer 12 is attached in the vehicle cabin, and the buzzer 12 outputs, for example, a warning sound. The display device 13 is attached in the vehicle cabin, and the display device 13 displays various messages and warning lamps. The electric power steering (EPS) 14 assists the operation of the steering wheel by utilizing the torque generated by an electric motor. The electronically controlled brake (ECB) 15 electrically adjusts the operating hydraulic pressure (braking hydraulic pressure) of a friction brake provided for each of the wheels.

ECU 1 has the following functions in order to control the various devices and systems by utilizing the output signals of the various sensors described above. That is, ECU 1 is provided with an obstacle information processing unit 100, a lane information processing unit 101, a lowered consciousness determination unit 102, a driver's intention determination unit 103, an integrated recognition processing unit 104, a common assist determination unit 105, a warning determination unit 106, a control determination unit 107, and a control amount (controlled variable) calculating unit 108.

The obstacle information processing unit 100 determines a regression straight line on which a plurality of non-travelable areas can be avoided or dodged by approximation on the basis of the coordinate information of the non-travelable areas such as a plurality of obstacles or the like outputted from the radar device 2, and the obstacle information processing unit 100 generates the information including, for example, the coordinate information of the regression straight line and the yaw angle of the vehicle with respect to the regression straight line. Further, if the non-travelable area such as a single obstacle or the like is detected by the radar device 2, the obstacle information processing unit 100 also generates the coordinate information of the concerning non-travelable area and the information concerning the yaw angle of the vehicle with respect to the non-travelable area. The obstacle information processing unit 100 may generate the information concerning the non-travelable area on the basis of the image photographed or picked up by the vehicle exterior camera 3. The non-travelable area is exemplified by the obstacle including, for example, guard rails, fences, side walls, curbstone, walkers, bicycles, and other vehicles, and the region or area in which any difference in height is present with respect to the traveling flat surface for allowing the vehicle to travel, including, for example, gutters, recesses, and steps. The non-travelable area includes the region in which it is intended not to allow the vehicle to travel and the region in which the traveling of the vehicle is not preferred, in addition to the region in which the vehicle cannot travel.

The lane information processing unit 101 generates the information concerning the lane (traffic lane) and the information concerning the attitude or posture of the vehicle with respect to the lane on the basis of the image picked up by the vehicle exterior camera 3. The information concerning the lane is the information concerning the road marking to indicate the lane boundary and the information concerning the width of the lane prescribed by the concerning road marking. The road marking, which indicates the lane boundary, is exemplified, for example, by the median strip and the partition between lanes including, for example, lines (partition lines) such as white lines, yellow lines, dotted lines and the like, road studs, and light emitting objects on the road surface, and the boundary between the roadway and those other than the roadway including, for example, boundaries between asphalt and gravel. The information concerning the attitude of the vehicle with respect to the lane is the information concerning the distance between the vehicle and the road marking to indicate the lane boundary, the information concerning the offset amount of the vehicle position with respect to central portion of the lane, and the information concerning the yaw angle in the traveling direction of the vehicle with respect to the road marking to indicate the lane boundary. In addition, when the vehicle carries a navigation system, the lane information processing unit 101 may generate the information concerning the lane (traffic lane) from the GPS information and the map information possessed by the navigation system.

The lowered consciousness determination unit 102 determines the degree of lowering of consciousness (degree of awakening) of the driver on the basis of the image photographed or picked up by the driver camera 4. The lowered consciousness determination unit 102 calculates the eye closing time and the eye closing frequency of the driver from the image picked up by the driver camera 4, and it is determined that the consciousness of the driver is lowered or decreased (it is determined that the degree of awakening is low) if the eye closing time or the eye closing frequency exceeds an upper limit value. Alternatively, the lowered consciousness determination unit 102 may calculate the time in which the direction of the face and/or the direction of the line of sight of the driver is/are deviated from the traveling direction of the vehicle, from the image picked up by the driver camera 4 to determine that the driver looks aside if the calculated time exceeds an upper limit value.

The driver's intention determination unit 103 discriminates whether or not the change of the operation amount of the brake pedal, the change of the operation amount of the accelerator pedal, or the change of the operation (steering) amount of the steering wheel is based on the intension of the driver, on the basis of the output signals of the wheel speed sensor 6, the brake sensor 7, the accelerator sensor 8, the winker switch 9, the steering angle sensor 10, and the steering torque sensor 11.

The integrated recognition processing unit 104 sets the traveling lane (driving lane or driving track) in which the vehicle can travel, on the basis of the information generated by the obstacle information processing unit 100 and the information generated by the lane information processing unit 101 to determine the yaw angle of the vehicle with respect to the traveling lane boundary and the offset amount of the vehicle with respect to the central portion of the traveling lane. Basically, the traveling lane is set to have a width equal to the lane width. In the case of a road on which a lane (traffic lane) has a narrow width, the driver inevitably departs the vehicle from the traffic lane in some cases. In relation thereto, as for the road on which the traffic lane has the narrow width, the integrated recognition processing unit 104 may set the traveling lane while departing from the traffic lane, on the basis of the information concerning the road marking to indicate the traffic lane boundary and the information concerning the non-travelable area existing around the traffic lane. In other words, the integrated recognition processing unit 104 may set, on the basis of road markings indicating the lane boundaries, a temporary traveling lane which is positioned beyond the road marking, and the integrated recognition processing unit 104 may set, on the basis of the temporary traveling lane and the non-travelable area, a definitive traveling lane which is positioned beyond the road marking. If the integrated recognition processing unit 104 receives the information concerning a single non-travelable area from the obstacle information processing unit 100, the integrated recognition processing unit 104 may set the traveling lane by elongating the length of the non-travelable area in parallel to the road. That is, the integrated recognition processing unit 104 may set the traveling lane such that the non-travelable area detected as the point on the coordinate is regarded as the line on the coordinate. The amount of elongation (length of the line), which is provided in this procedure, may be made long if the output signal (vehicle velocity) of the wheel speed sensor 6 is high and/or if the yaw angle of the vehicle with respect to the line is large, as compared with if the vehicle velocity is low and/or if the yaw angle with respect to the line is small.

Further, the level of recognition LR is given to the traveling lane set by the integrated recognition processing unit 104. The level of recognition LR of the traveling lane is represented by digitizing the accuracy (certainty) of the traveling lane which is set by combining the accuracy (certainty of presence) of the non-travelable area based on the information generated by the obstacle information processing unit 100 and the accuracy (certainty of presence) of the road marking to indicate the lane boundary based on the information generated by the lane information processing unit 101. It is assumed that the higher the level of recognition LR is, the more satisfactory the situation is. In other words, the level of recognition LR of the traveling lane is the degree to discriminate whether or not the warning or the support is performed. If the level of recognition LR is not less than a first threshold value (predetermined threshold value), the warning or the support is performed, while if the level of recognition LR is lower than the first threshold value (predetermined threshold value), the warning or the support is not performed. A map, which represents the relationship between the level of recognition LR of the traveling lane and the number of detected edges, is used for the specified calculating method for calculating the level of recognition LR of the traveling lane as calculated by the integrated recognition processing unit 104. Each of the accuracy (certainty of presence) of the non-travelable area based on the information generated by the obstacle information processing unit 100 and the accuracy (certainty of presence) of the road marking to indicate the lane boundary based on the information generated by the lane information processing unit 101 is proportional to the number of detected edges as provided when each of them is detected. In other words, it is assumed that the larger the number of detected edges is, the higher the accuracy of the non-travelable area and the accuracy of the road marking to indicate the lane boundary are. Therefore, the level of recognition LR of the traveling lane can be calculated by looking up in the map the number of detected edges concerning the non-travelable area and the road marking to indicate the lane boundary as used when the traveling lane is set. It is also appropriate that the traveling lane itself is not set if the number of detected edges is less than a predetermined score.

The common assist determination unit 105 discriminates whether or not the drive assist process is executed on the basis of the information generated by the integrated recognition processing unit 104, the determination result of the lowered consciousness determination unit 102, and the determination result of the driver's intention determination unit 103. The common assist determination unit 105 may permit the execution of the drive assist process if it is determined by the lowered consciousness determination unit 102 that the consciousness of the driver is lowered or the driver looks aside. On the other hand, the common assist determination unit 105 may restrict the execution of the drive assist process if it is determined by the driver's intention determination unit 103 that the driver performs the intentional operation. Further, if the level of recognition LR of the traveling lane, which is calculated by the integrated recognition processing unit 104, is not less than the predetermined first threshold value Rth, the common assist determination unit 105 unconditionally executes the drive assist process. On the other hand, if the level of recognition LR of the traveling lane is lower than the predetermined first threshold value Rth, the drive assist process is not executed. Alternatively, if the level of recognition LR of the traveling lane is lower than the predetermined first threshold value Rth, it is also allowable that the drive assist process can be executed if a certain special condition holds. In this context, the first threshold value Rth is the threshold value which is provided in order to discriminate whether or not the drive assist process is unconditionally executed on the basis of only the level of recognition LR of the traveling lane. If the level of recognition LR of the traveling lane is higher than the first threshold value Rth, the drive assist process can be unconditionally executed. Therefore, if the level of recognition LR of the traveling lane is lower than the first threshold value Rth, the execution of the drive assist process is ordinarily restricted. However, even in the case of such a condition that the level of recognition LR of the traveling lane is lower than the first threshold value Rth and the execution of the drive assist process is restricted, it is also allowable to execute the drive assist process, for example, if at least any one of the degree of awakening of the driver and the degree of the driving operation is low.

If the execution of the drive assist process is permitted by the common assist determination unit 105, the warning determination unit 106 determines the beeping timing of the buzzer 12 and the display timing of the warning message or the warning lamp to be displayed by the display device 13. The warning determination unit 106 may perform the beeping of the buzzer 12 and/or display of the warning message or the warning lamp to be displayed by the display device 13, if the distance between the vehicle and the traveling lane boundary in the widthwise direction of the vehicle is not more than a predetermined distance, if the distance is zero, or if the vehicle travels beyond (exceeds) the traveling lane boundary. The warning determination unit 106 not only performs the beeping of the buzzer 12 and the display of the warning message or the warning lamp to be displayed by the display device 13 on the basis of the traveling lane boundary but also performs the following operation. That is, the warning determination unit 106 may enlarge the beeping of the buzzer 12 and/or the warning determination unit 106 may enlarge the display of the warning message or the warning lamp to be displayed by the display device 13, in relation to such a direction that the departure from the traveling lane is caused, while grasping the traveling lane boundary more broadly in view of the potential. The warning determination unit 106 may perform the beeping of the buzzer 12 and/or the display of the warning message or the warning lamp to be displayed by the display device 13, if the estimated time taken for the vehicle to depart from a boundary of the traveling lane in the widthwise direction of the vehicle (which will be hereinafter referred to as the estimated time to lane crossing TLC), is not more than a predetermined time. When the vehicle enters a curve or when the vehicle travels along a curve, then the warning determination unit 106 may perform the beeping of the buzzer 12 and/or the display of the warning message or the warning lamp to be displayed by the display device 13, if the distance between the vehicle and the traveling lane boundary in the traveling direction of the vehicle is not more than a predetermined distance, if the distance is zero, or if the vehicle travels beyond the traveling lane boundary. When the vehicle enters a curve or when the vehicle travels along a curve, then the warning determination unit 106 may perform the beeping of the buzzer 12 and/or the display of the warning message or the warning lamp to be displayed by the display device 13, if the time, which is required until the vehicle arrives at the traveling lane boundary in the traveling direction of the vehicle, is not more than a predetermined time. The timing, at which the warning determination unit 106 performs the beeping of the buzzer 12 and/or the display of the warning message or the warning lamp to be displayed by the display device 13, corresponds to the timing at which the assist is to be performed.

In this procedure, the predetermined distance and the predetermined time, which are used by the warning determination unit 106 to perform the beeping of the buzzer 12 and/or the display of the warning message or the warning lamp to be displayed by the display device 13, are the values which are changed depending on the output signal of the wheel speed sensor 6 (vehicle velocity) and the output signal of the yaw rate sensor 5 (yaw rate). When the vehicle velocity is high, then the predetermined distance is set to be long or the predetermined time is set to be long, as compared with when the vehicle velocity is low. When the yaw rate is large, then the predetermined distance is set to be long or the predetermined time is set to be long, as compared with when the yaw rate is small.

The method for warning the driver is not limited to the beeping of the buzzer 12 and the display of the warning message or the warning lamp to be displayed on the display device 13. It is also allowable to adopt, for example, a method in which the tightening torque of a seat belt is changed intermittently.

If the execution of the drive assist process is permitted by the common assist determination unit 105, the control determination unit 107 determines whether or not the electric power steering (EPS) 14 and/or the electronically controlled brake (ECB) 15 is/are operated in order to avoid the departure from the traveling lane. The control determination unit 107 may operate the electric power steering (EPS) 14 and/or the electronically controlled brake (ECB) 15 if the distance between the vehicle and the traveling lane boundary in the widthwise direction of the vehicle is not more than a predetermined distance, if the distance is zero, or if the vehicle travels beyond the traveling lane boundary. The control determination unit 107 may operate the electric power steering (EPS) 14 and/or the electronically controlled brake (ECB) 15, if the time, which is required until the vehicle arrives at the traveling lane boundary in the widthwise direction of the vehicle, is not more than a predetermined time. When the vehicle enters a curve or when the vehicle travels along a curve, then the control determination unit 107 may operate the electric power steering (EPS) 14 and/or the electronically controlled brake (ECB) 15, if the distance between the vehicle and the traveling lane boundary in the traveling direction of the vehicle is not more than a predetermined distance, if the distance is zero, or if the vehicle travels beyond the traveling lane boundary. When the vehicle enters a curve or when the vehicle travels along a curve, then the control determination unit 107 may operate the electric power steering (EPS) 14 and/or the electronically controlled brake (ECB) 15, if the time, which is required until the vehicle arrives at the traveling lane boundary in the traveling direction of the vehicle, is not more than a predetermined time. The timing, at which the control determination unit 107 operates the electric power steering (EPS) 14 and/or the electronically controlled brake (ECB) 15, corresponds to the timing at which the assist is to be performed.

The predetermined distance and the predetermined time, which are used by the control determination unit 107, are changed depending on the vehicle velocity and the yaw rate in the same manner as the predetermined distance and the predetermined time used by the warning determination unit 106. However, the predetermined distance and the predetermined time, which are used by the control determination unit 107, may be set to be shorter than the predetermined distance and the predetermined time which are used by the warning determination unit 106.

If the operation request for operating the electric power steering (EPS) 14 and/or the electronically controlled brake (ECB) 14 is generated by the control determination unit 107, then the control amount calculating unit 108 calculates the control amounts of the electric power steering (EPS) 14 and the electronically controlled brake (ECB) 15, and the control amount calculating unit 108 operates the electric power steering (EPS) 14 and the electronically controlled brake (ECB) 15 in accordance with the calculated control amounts. The control amount calculating unit 108 calculates the target yaw rate required to avoid the departure form the traveling lane by using, as the parameters, the information generated by the integrated recognition processing unit 104, the output signal of the wheel speed sensor 6 (vehicle velocity), and the output signal of the yaw rate sensor 5 (yaw rate). In particular, the control amount calculating unit 108 calculates the target yaw rate Ytrg in accordance with the following expression assuming that D represents the relative distance from the traveling lane boundary, V represents the velocity of the vehicle (vehicle velocity), and θ represents the yaw angle of the vehicle with respect to the traveling lane boundary.

$$Ytrg=(\theta \cdot V \sin \theta)/D$$

The control amount calculating unit 108 determines the control amount (steering torque) of the electric power steering (EPS) 14 and the control amount (braking hydraulic pressure) of the electronically controlled brake (ECB) 15 by using the target yaw rate Ytrg as the parameter (argument). In this procedure, the relationship between the target yaw rate Ytrg and the steering torque and the relationship between the target yaw rate Ytrg and the braking hydraulic pressure may be previously mapped. If the target yaw rate Ytrg is smaller than a predetermined value (maximum value of the yaw rate at which the avoidance of the departure from the traveling lane can be achieved by only the steering), the braking hydraulic pressure of the electronically controlled brake (ECB) 15 may be set to zero. When the electronically controlled brake (ECB) 15 is operated, if different braking hydraulic pressures are applied to the friction brakes for the left and right wheels of the vehicle, then a yaw rate, which interferes with the yaw rate generated by the electric power steering (EPS) 14, is generated. Therefore, it is desirable that equivalent braking hydraulic pressures are applied to the friction brakes for the left and right wheels. The control amount calculating unit 108 not only operates the electric power steering (EPS) 14 and the electronically controlled brake (ECB) 15 on the basis of the traveling lane boundary but also performs the following operation. That is, the control amount calculating unit 108 may increase the control amounts in relation to such a direction that the departure from the traveling lane is caused, while grasping the traveling lane boundary more broadly in view of the potential.

The method for decelerating the vehicle is not limited to the method in which the friction brake is operated by means of the electronically controlled brake (ECB) 15. It is also allowable to use a method in which the kinetic energy of the vehicle is converted (regenerated) into the electric energy and a method in which the transmission gear ratio of a transmission is changed to increase the engine brake.

According to the drive assist apparatus described above, it is possible to warn the driver of the departure from the traveling lane which is set on the basis of the traffic lane and the non-travelable area such as the obstacle or the like, and it is possible to assist the operation in order to avoid the departure from the traveling lane.

(Traveling Lane Setting Control if Oncoming Vehicle is Present)

The integrated recognition processing unit 104 sets the traveling lane in which the subject vehicle can travel on the basis of the information generated by the obstacle information processing unit 100 and the information generated by the lane information processing unit 101.

In this procedure, if the oncoming vehicle travels in the direction opposite to the direction of the subject vehicle, on the opposite lane of the same road as the road on which the subject vehicle travels, there is such a possibility that the traveling of the subject vehicle may be hindered by the oncoming vehicle due to the sudden or unforeseen entry of the oncoming vehicle in the traveling direction of the subject vehicle when the subject vehicle ordinarily travels. It is also desired that the traveling of the subject vehicle is assisted against the sudden entry of the oncoming vehicle in the traveling direction of the subject vehicle as described above. However, if it is intended to assist the driving (traveling) by means of only the relative velocity between the subject vehicle and the oncoming vehicle, the driving (traveling) is intended to be assisted even if the oncoming vehicle merely travels straight on the opposite lane in some cases. It is considered that the accuracy of the assist may be lowered.

In view of the above, in this embodiment, if the oncoming vehicle is present, the timing at which the assist is to be performed is changed by changing the boundary position of the traveling lane depending on the lane entering angle of the oncoming vehicle with respect to the traveling lane and the lane departure angle of the subject vehicle with respect to the traveling lane set for the subject vehicle. The boundary position of the traveling lane is changed such that the boundary position of the traveling lane is changed in the direction to make separation or the direction to make approach with respect to the subject vehicle without changing the extending direction of the traveling lane.

Figure 2:
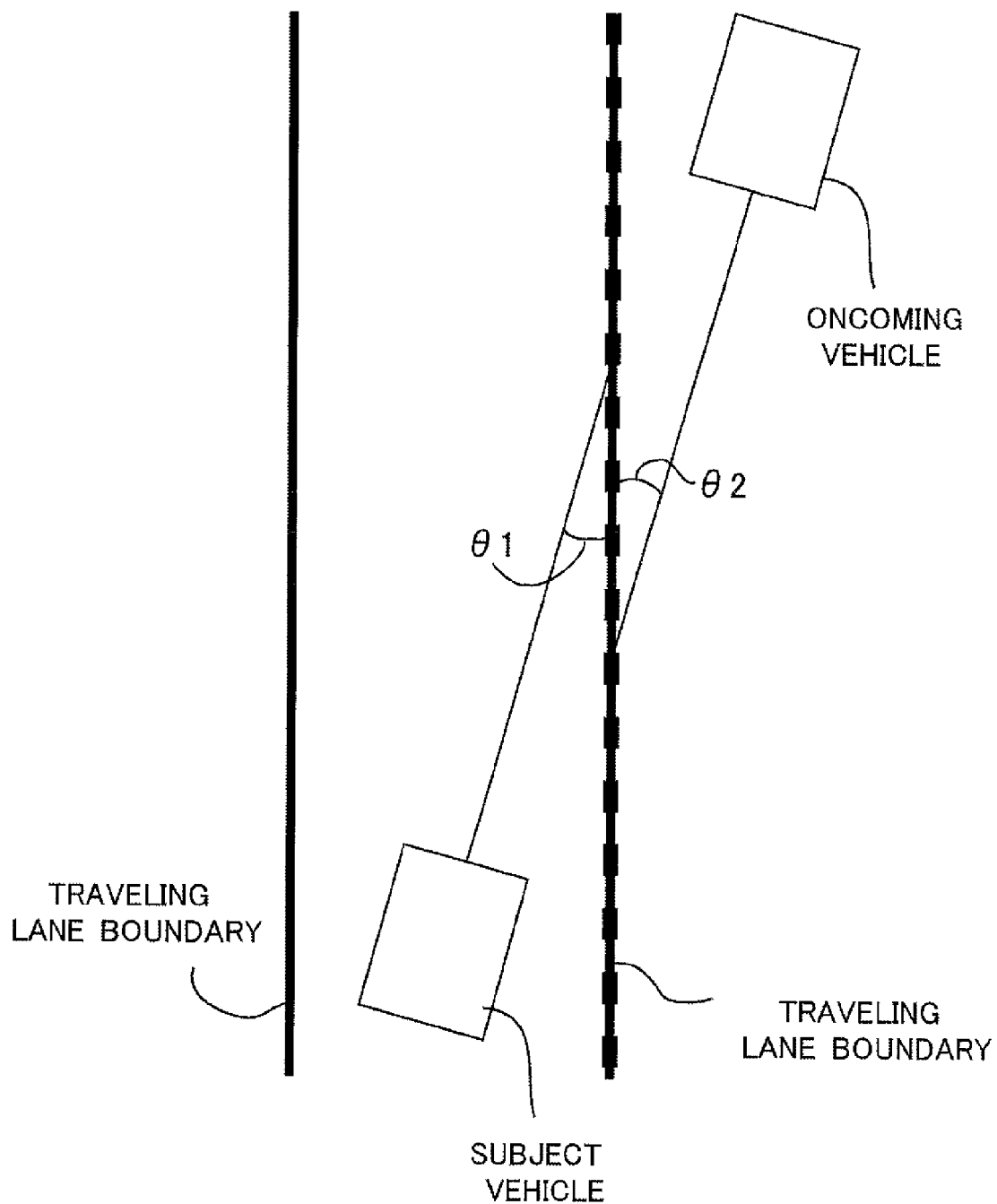
FIG. 2 shows a situation in which a subject vehicle and an oncoming vehicle are present on a road according to the first embodiment.

FIG. 2 shows a situation in which the subject vehicle and the oncoming vehicle are present on a road. In FIG. 2, the traveling lane of the subject vehicle has a width equal to the traffic lane width, and the road marking, which indicates the lane boundary, is set at the traveling lane boundary. In this case, as shown in FIG. 2, the lane departure angle of the subject vehicle with respect to the traveling lane can be represented by an acute angle $\theta 1$ formed by the extending direction of the traveling lane and the traveling direction of the subject vehicle. The lane entering angle of the oncoming vehicle with respect to the traveling lane can be represented by an acute angle $\theta 2$ formed by the extending direction of the traveling lane and the traveling direction of the oncoming vehicle.

Figure 3:
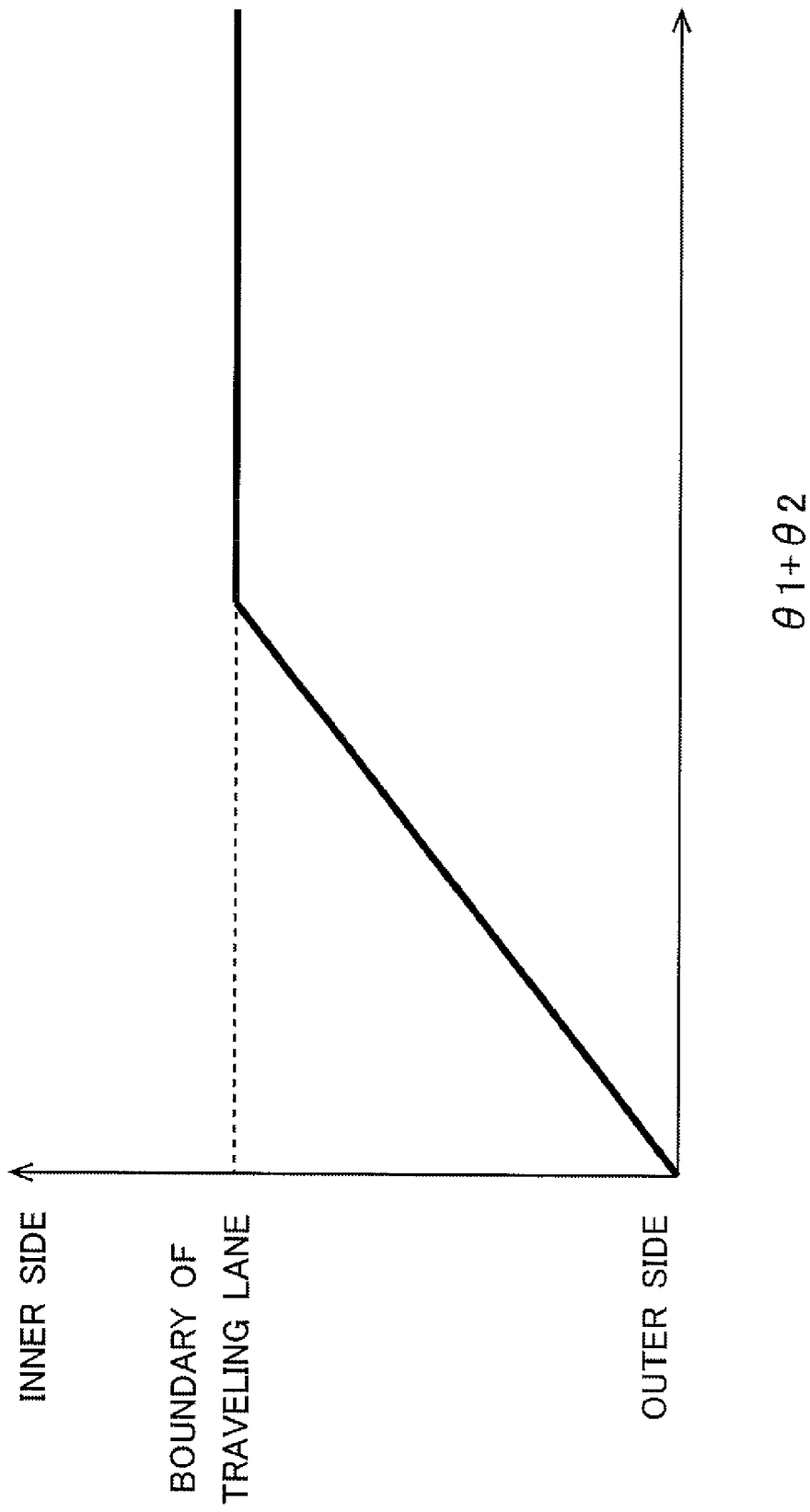
FIG. 3 shows a relationship between ($\theta 1+\theta 2$) and the traveling lane boundary according to the first embodiment.

FIG. 3 shows a relationship between $(\theta 1+\theta 2)$ and the traveling lane boundary. As shown in FIG. 3, as the $(\theta 1+\theta 2)$ is larger, the boundary position of the traveling lane is set nearer to the side of the subject vehicle so that the timing at which the assist is to be performed is advanced. In the case of this embodiment, if the oncoming vehicle is present, then $(\theta 1+\theta 2)$ is looked up in the map shown in FIG. 3, and the setting is performed to change the boundary position of the traveling lane. $\theta 1$ and $\theta 2$, which are used in this procedure, have the values obtained by performing the weighting as described later on. In the case of FIG. 3, if $(\theta 1+\theta 2)$ is not less than a predetermined threshold value, then the boundary position of the traveling lane is limited or restricted to a predetermined position, and the boundary position is not positioned nearer to (not allowed to approach) the side of the subject vehicle any more. The reason, why the boundary position of the traveling lane is limited or restricted to the predetermined position as described above, is that it is feared that any unnecessary operation of the driving assist may be frequently performed if the boundary of the traveling lane is positioned excessively nearer to the side of the subject vehicle.

Figure 4:
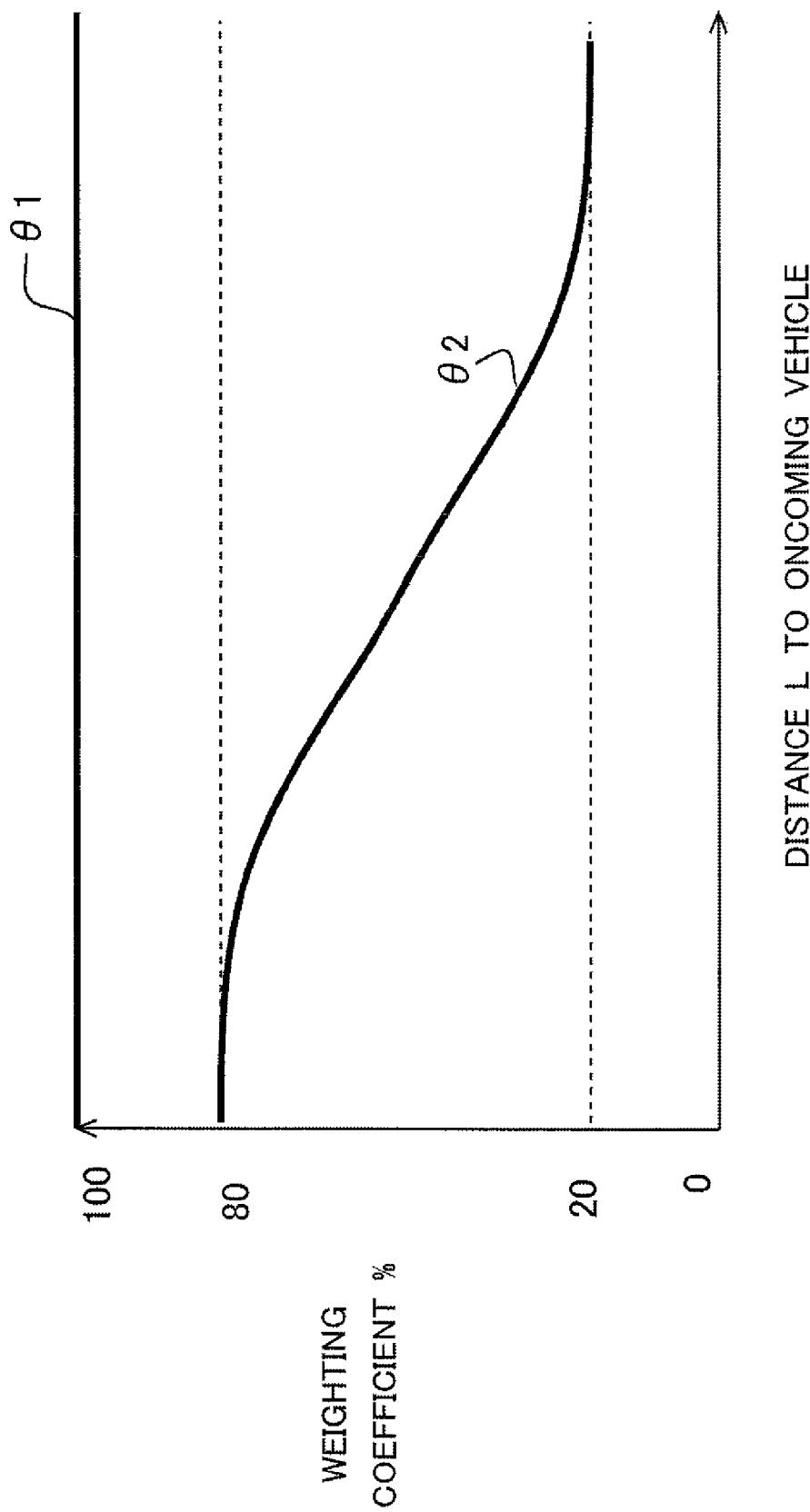
FIG. 4 shows weighting coefficients of $\theta 1$ and $\theta 2$ according to the first embodiment.

FIG. 4 shows weighting coefficients of $\theta 1$ and $\theta 2$. $\theta 1$ is calculated in accordance with the relationship between the subject vehicle and the traveling lane, and hence it is highly accurate. Therefore, the weighting of $\theta 1$ can be maintained to be 100% even when the distance to the oncoming vehicle increases. $\theta 2$ is calculated in accordance with the relationship between the oncoming vehicle and the traveling lane as detected by the radar device 2 and/or the vehicle exterior camera 3. Therefore, the more the distance to the oncoming vehicle increases, the more deteriorated the accuracy is, for the following reason. That is, any difference arises in the accuracy of the oncoming vehicle to be recognized, due to the dispersion of the performance of the radar device 2 and/or the vehicle exterior camera 3, and calculated $\theta 2$ is not sufficient in accuracy in some cases. Therefore, the weighting coefficient of $\theta 2$ is more lowered, as the distance to the oncoming vehicle increases. $\theta 1$, $\theta 2$, which are calculated depending on the distance L to the oncoming vehicle respectively, are multiplied by the weighting coefficients of $\theta 1$, $\theta 2$ to calculate the normal or regular values of $\theta 1$ and $\theta 2$ subjected to the weighting. Accordingly, the normal $\theta 1$ and $\theta 2$, to which the weighting is applied, are used, and thus it is possible to set the boundary position of the traveling lane which is more suited or conformed to the sense of the driver, while taking the detection errors of the radar device 2 and the vehicle exterior camera 3 into consideration.

FIG. 5A to 5C shows the boundary position of the traveling lane set on the basis of the difference in the magnitude of ($\theta1+\theta2$). In the case of FIG. 5A, the oncoming vehicle is absent. Therefore, even if the subject vehicle has the lane departure angle $\theta1$, the boundary of the traveling lane on the road marking to indicate the traffic lane boundary, which is set for the subject vehicle, is maintained in the ordinary state as it is, without taking the lane departure angle $\theta1$ of the subject vehicle into consideration.

In the case of FIG. 5B, the oncoming vehicle travels straight on the opposite lane. Therefore, there is given the lane entering angle $\theta2=0°$. On the other hand, the subject vehicle has the lane departure angle $\theta1$. In this case, the oncoming vehicle is present, and hence ($\theta1+\theta2$) is looked up in the map shown in FIG. 3. There is given $\theta2=0$, and hence the boundary position of the traveling lane is positioned nearer to (allowed to approach) the side of the subject vehicle by an amount corresponding to $\theta1$.

In the case of FIG. 5C, the oncoming vehicle has the lane entering angle $\theta2$. On the other hand, the subject vehicle has the lane departure angle $\theta1$. In this case, the oncoming vehicle is present, and hence ($\theta1+\theta2$) is looked up in the map shown in FIG. 3. The boundary position of the traveling lane is positioned nearer to the side of the subject vehicle by an amount corresponding to ($\theta1+\theta2$). In the case of FIG. 5C, the boundary position of the traveling lane is positioned nearest to the side of the subject vehicle.

According to the foregoing description, if the oncoming vehicle is present, the timing at which the assist is to be performed is changed by changing the boundary position of the traveling lane depending on the lane departure angle $\theta1$ of the subject vehicle and the lane entering angle $\theta2$ of the oncoming vehicle. Accordingly, as the behaviors of the oncoming vehicle and the subject vehicle are the behaviors having higher possibilities to hinder the traveling of the subject vehicle, it is possible to advance the timing at which the assist is to be performed. In this way, it is possible to perform the assist of the warning or the support in response to the behaviors of the oncoming vehicle and the subject vehicle during the ordinary traveling of the subject vehicle on the road having the opposite lane.

(Traveling Lane Setting Control Routine if Oncoming Vehicle is Present)

Figure 6:
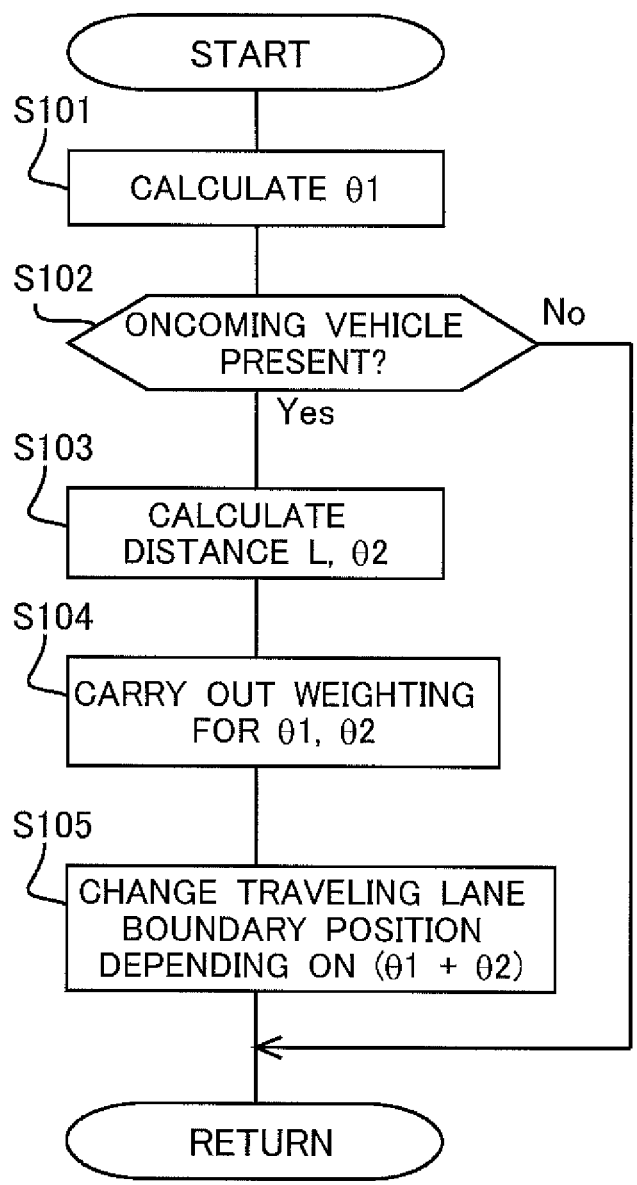
FIG. 6 shows a flow chart illustrating the traveling lane setting control routine as provided if the oncoming vehicle is present according to the first embodiment.

An explanation will be made on the basis of a flow chart shown in FIG. 6 about the traveling lane setting control routine if the oncoming vehicle is present, as executed by the integrated recognition processing unit 104. FIG. 6 shows the flow chart illustrating the traveling lane setting control routine as provided if the oncoming vehicle is present. This routine is repeatedly executed by the integrated recognition processing unit 104 of ECU 1 every time when a predetermined period of time elapses.

When the routine shown in FIG. 6 is started, the lane departure angle $\theta1$ of the subject vehicle is calculated with respect to the traveling lane previously set by the integrated recognition processing unit 104 in S101. The lane departure angle $\theta1$ can be calculated from the extending direction of the traveling lane and the traveling direction of the subject vehicle determined, for example, from the information of the vehicle exterior camera 3.

In S102, it is discriminated whether or not the oncoming vehicle is present on the road on which the subject vehicle travels. The oncoming vehicle is detected by the radar device 2 and/or the vehicle exterior camera 3. If the affirmative determination is made in S102, the routine proceeds to S103. If the negative determination is made in S102, this routine is once completed.

In S103, the distance L to the oncoming vehicle and the lane entering angle $\theta2$ of the oncoming vehicle with respect to the traveling lane are calculated. The distance L to the oncoming vehicle is detected by the radar device 2 and/or the vehicle exterior camera 3. The lane entering angle $\theta2$ can be calculated from the extending direction of the traveling lane and the traveling direction (behavior) of the oncoming vehicle detected by the radar device 2 and/or the vehicle exterior camera 3.

In S104, the weighting is performed for $\theta1$ and $\theta2$. The distance L to the oncoming vehicle, which is calculated in S103, is looked up in the map shown in FIG. 4, and the weighting coefficients are calculated for $\theta1$ and $\theta2$. Further, the lane departure angle, which is calculated in S101, is multiplied by the weighting coefficient of $\theta1$, and weighted $\theta1$ is calculated. The lane entering angle, which is calculated in S103, is multiplied by the weighting coefficient of $\theta2$, and weighted $\theta2$ is calculated.

In S105, the boundary position of the traveling lane is changed depending on ($\theta1+\theta2$) subjected to the weighting. Specifically, weighted $\theta1$ and $\theta2$, which are calculated in S104, are added, and weighted ($\theta1+\theta2$) is looked up in the map shown in FIG. 3 to calculate the distance by which the boundary position of the traveling lane is set nearer to the side of the subject vehicle. Further, the traveling lane is set nearer to the side of subject vehicle from the traveling lane having been previously set, by the amount of the calculated distance by which the approach is made to the side of the subject vehicle. After the process of this step, this routine is once completed.

According to the concerning routine as described above, if the oncoming vehicle is present, it is possible to change the boundary position of the traveling lane depending on the lane departure angle $\theta1$ and the lane entering angle $\theta1$. On the basis of the boundary position of the traveling lane having been changed as described above, the warning determination unit 106 determines the operation timing of the alarm or warning, and the control determination unit 107 determines the operation timings of the electric power steering (EPS) 14 and the electronically controlled brake (ECB) 15. Therefore, it is possible to change the timing at which the assist is to be performed.

Second Embodiment

In the first embodiment described above, the timing at which the assist is to be performed is changed by changing the boundary position of the traveling lane. However, the method for changing the timing at which the assist is to be performed is not limited thereto. In this embodiment, the timing at which the assist is to be performed is changed by changing the value of time or distance to lane crossing until the departure of the vehicle from the traveling lane boundary wherein the assist is to be performed at the timing when the time or distance arrives at the value. In this embodiment, the feature thereof will be explained. The other construction will be omitted from the explanation.

(Assistance Execution Timing-Determining Control if Oncoming Vehicle is Present)

In this embodiment, the timing at which the assist is to be performed is provided for the warning determination unit 106 and the control determination unit 107 when the estimated time to lane crossing until the departure of the vehicle from the traveling lane boundary arrives at a predetermined time. Alternatively, the timing at which the assist is to be performed may be provided when the estimated distance to lane crossing until the departure of the vehicle from the boundary of the traveling lane arrives at a predetermined distance. The threshold value of an estimated time and/or distance to lane crossing until the departure of the vehicle from the traveling lane boundary wherein the assist is to be performed at the timing when the estimated time and/or distance arrives at the threshold value (value of the time and/or distance at which assist is to be performed) as described above, is constant when the operation is ordinarily performed. However, in this embodiment, the timing at which the assist is to be performed is changed by changing the value of the time and/or distance at which assist is to be performed, depending on the lane entering angle of the oncoming vehicle with respect to the traveling lane set for the subject vehicle and the lane departure angle of the subject vehicle with respect to the traveling lane, if the oncoming vehicle is present. The boundary position of the traveling lane is changed such that the boundary position of the traveling lane is changed in the direction to make separation or the direction to make approach with respect to the subject vehicle without changing the extending direction of the traveling lane.

FIG. 7 shows a relationship between ($\theta 1+\theta 2$) and the value of the time and distance at which assist is to be performed. As shown in FIG. 7, the larger ($\theta 1+\theta 2$) is, the larger the value of time and distance at which assist is to be performed are, wherein the timing at which the assist is to be performed is advanced so that the assist is started even when the subject vehicle is positioned far from the boundary position of the traveling lane. In the case of this embodiment, if the oncoming vehicle is present, ($\theta 1+\theta 2$) is looked up in the map shown in FIG. 7 to perform the setting so that the value of the time and/or distance at which assist is to be performed is/are changed. $\theta 1$ and $\theta 2$, which are used in this procedure, have the values obtained after performing the weighting as explained in the foregoing embodiment. In FIG. 7, if ($\theta 1+\theta 2$) is not less than a predetermined threshold value, then the value of time and/or distance at which assist is to be performed, is/are limited or restricted to a predetermined value or predetermined values, and the value of time and/or distance at which assist is to be performed is/are not increased any more. The reason, why the value of time and/or distance at which assist is to be performed, is/are limited or restricted to the predetermined value or predetermined values as described above, is that it is feared that any unnecessary operation of the driving assist may be frequently performed if the value of time and/or distance at which assist is to be performed, is/are excessively increased.

FIG. 8 shows the line H corresponding to the value of the time and/or distance at which assist is to be performed set on the basis of the difference in the magnitude of ($\theta 1+\theta 2$). In the case of FIG. 8A, the oncoming vehicle is absent. Therefore, even if the subject vehicle has the lane departure angle $\theta 1$, the line H is maintained at a constant value from the boundary of the traveling lane as the road marking to indicate the lane boundary set for the subject vehicle in the ordinary state as it is without taking the lane departure angle $\theta 1$ of the subject vehicle into consideration.

In the case of FIG. 8B, the oncoming vehicle travels straight on the opposite lane. Therefore, there is given the lane entering angle $\theta 2=0°$. On the other hand, the subject vehicle has the lane departure angle $\theta 1$. In this case, the oncoming vehicle is present, and hence ($\theta 1+\theta 2$) is looked up in the map shown in FIG. 7. There is given $\theta 2=0$, and hence the line H corresponding to the value of the time and/or distance at which assist is to be performed, is positioned nearer to (allowed to approach) the side of the subject vehicle by an amount corresponding to $\theta 1$ from the boundary of the traveling lane.

In the case of FIG. 8C, the oncoming vehicle has the lane entering angle $\theta 2$. On the other hand, the subject vehicle has the lane departure angle $\theta 1$. In this case, the oncoming vehicle is present, and hence ($\theta 1+\theta 2$) is looked up in the map shown in FIG. 7. The line H corresponding to the value of the time and/or distance at which assist is to be performed is positioned nearer to the side of the subject vehicle by an amount corresponding to ($\theta 1+\theta 2$) from the boundary of the traveling lane. In the case of FIG. 8C, the line H corresponding to the value of the time and/or distance at which assist is to be performed is positioned nearest to the side of the subject vehicle. That is, the value of the time and/or distance at which assist is to be performed is/are most increased.

According to the foregoing description, if the oncoming vehicle is present, the timing at which the assist is to be performed is changed by changing the value of the time and/or distance at which assist is to be performed depending on the lane departure angle $\theta 1$ of the subject vehicle and the lane entering angle $\theta 2$ of the oncoming vehicle. Accordingly, as the behaviors of the oncoming vehicle and the subject vehicle are the behaviors having higher possibilities to hinder the traveling of the subject vehicle, it is possible to advance the timing at which the assist is to be performed. In this way, it is possible to perform the assist of the warning or the support in response to the behaviors of the oncoming vehicle and the subject vehicle during the ordinary traveling of the subject vehicle on the road having the opposite lane.

(Assistance Execution Timing-Determining Control Routine if Oncoming Vehicle is Present)

Figure 9:
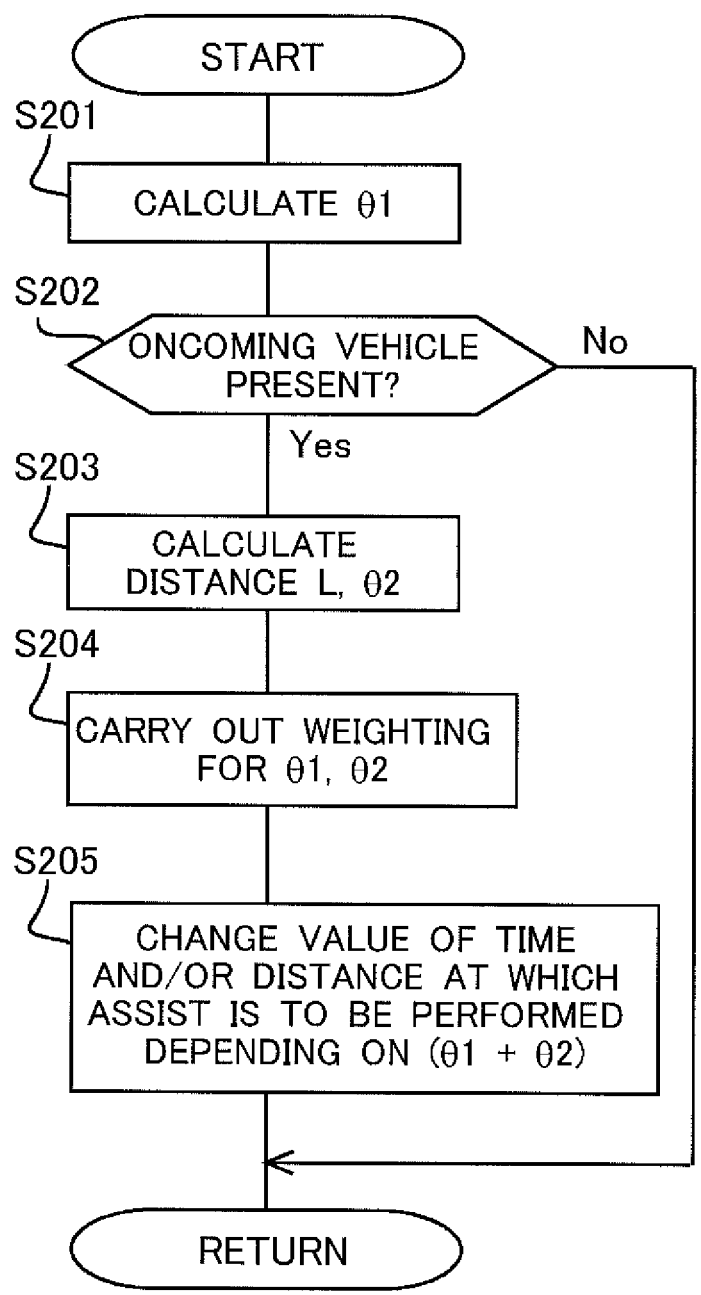
FIG. 9 shows a flow chart illustrating the assist execution timing-determining control routine as provided if an oncoming vehicle is present according to the second embodiment.

An explanation will be made on the basis of a flow chart shown in FIG. 9 about the assist execution timing-determining control routine if the oncoming vehicle is present, as executed by the warning determination unit 106 and the control determination unit 107. FIG. 9 shows the flow chart illustrating the assist execution timing-determining control routine as provided if the oncoming vehicle is present. This routine is repeatedly executed by the warning determination unit 106 or the control determination unit 107 of ECU 1 every time when a predetermined period of time elapses.

When the routine shown in FIG. 9 is started, the lane departure angle $\theta 1$ of the subject vehicle is calculated in S201 with respect to the traveling lane previously set by the integrated recognition processing unit 104. The lane departure angle $\theta 1$ can be calculated from the extending direction of the traveling lane and the traveling direction of the subject vehicle determined, for example, from the information of the vehicle exterior camera 3.

In S202, it is discriminated whether or not the oncoming vehicle is present on the road on which the subject vehicle travels. The oncoming vehicle is detected by the radar device 2 and/or the vehicle exterior camera 3. If the affirmative determination is made in S202, the routine proceeds to S203. If the negative determination is made in S202, this routine is once completed.

In S203, the distance L to the oncoming vehicle and the lane entering angle $\theta 2$ of the oncoming vehicle with respect to the traveling lane are calculated. The distance L to the oncoming vehicle is detected by the radar device 2 and/or the vehicle exterior camera 3. The lane entering angle $\theta 2$ can be calculated from the extending direction of the traveling lane and the traveling direction (behavior) of the oncoming vehicle detected by the radar device 2 and/or the vehicle exterior camera 3.

In S204, the weighting is performed for θ1 and θ2. The distance L to the oncoming vehicle, which is calculated in S203, is looked up in the map shown in FIG. 4, and the weighting coefficients are calculated for θ1 and θ2. Further, the lane departure angle, which is calculated in S101, is multiplied by the weighting coefficient of θ1, and weighted θ1 is calculated. The lane entering angle, which is calculated in S103, is multiplied by the weighting coefficient of θ2, and weighted θ2 is calculated.

In S205, the value of time and/or distance at which assist is to be performed, is/are changed depending on (θ1+θ2) subjected to the weighting. Specifically, weighted θ1 and θ2, which are calculated in S204, are added, and weighted (θ1+θ2) is looked up in the map shown in FIG. 7 to calculate the value by which the value of the time and/or distance at which assist is to be performed is/are increased. Further, the amount of the calculated value, by which the approach is performed to the side of the subject vehicle, is added to the value of the time and/or distance at which assist is to be performed set in the ordinary situation. After the process of this step, this routine is once completed.

According to the concerning routine as described above, if the oncoming vehicle is present, it is possible to change the value of the time and/or distance at which assist is to be performed, depending on the lane departure angle θ1 and the lane entering angle θ1. On the basis of the value of the time and/or distance at which assist is to be performed having been changed as described above, the warning determination unit 106 determines the operation timing of the alarm or warning, and the control determination unit 107 determines the operation timings of the electric power steering (EPS) 14 and the electronically controlled brake (ECB) 15. Therefore, it is possible to change the timing at which the assist is to be performed.

(Other Things)

The driving assist apparatus according to the present invention is not limited to the embodiments described above. It is also allowable to apply various changes within a scope or range without deviating from the gist or essential characteristics of the present invention. In the embodiments described above, the timing at which the assist is to be performed is changed depending on the lane departure angle θ1 of the subject vehicle and the lane entering angle θ2 of the oncoming vehicle. However, in the driving assist apparatus of the present invention, it is also allowable that the timing at which the assist is to be performed is changed depending on only the lane entering angle θ2 of the oncoming vehicle. Accordingly, as the behavior of the oncoming vehicle is the behavior having a higher possibility to hinder the traveling of the subject vehicle, it is possible to advance the timing at which the assist is to be performed. In this way, it is possible to perform the assist of the warning or the support in response to the behavior of the oncoming vehicle during the ordinary traveling of the subject vehicle on the road having the opposite lane. Further, the embodiments described above are also embodiments of the travel assist method according to the present invention.

REFERENCE SIGNS LIST

1: ECU, 2: radar device, 3: vehicle exterior camera, 4: driver camera, 5: yaw rate sensor, 6: wheel speed sensor, 7: brake sensor, 8: accelerator sensor, 9: winker switch, 10: steering angle sensor, 11: steering torque sensor, 12: buzzer, 13: display device, 14: EPS, 15: ECB, 100: obstacle information processing unit, 101: lane information processing unit, 102: lowered consciousness determination unit, 103: driver's intention determination unit, 104: integrated recognition processing unit, 105: common assist determination unit, 106: warning determination unit, 107: control determination unit, 108: control amount calculating unit.

The invention claimed is:

1. A travel assist apparatus that performs assist of warning or support so that a departure of a subject vehicle from a traveling lane is avoided, the apparatus comprising:
at least one processor configured to:
set the traveling lane based on a non-travelable area or a road marking to indicate a lane boundary;
change a boundary position of the lane boundary of the traveling lane such that the boundary position approaches a subject vehicle as a lane entering angle of an oncoming vehicle with respect to the traveling lane and a lane departure angle of the subject vehicle with respect to the travelling lane increases,
wherein the lane departure angle of the subject vehicle with respect to the traveling lane is formed by the extending direction of the traveling lane and the traveling direction of the subject vehicle and the lane entering angle of oncoming vehicle with respect to the traveling lane is formed by the extending direction of the traveling lane and the traveling direction of the oncoming vehicle;
determine whether at least one of a distance between the subject vehicle and the boundary position or a time required until the subject vehicle arrives at the boundary position is not more than a predetermined value; and
upon an affirmative determination, perform assist of the warning or support so that the departure of the subject vehicle from the traveling lane is avoided.

2. The travel assist apparatus according to claim 1, wherein the at least one processor is further configured to:
change the boundary position of the traveling lane such that the boundary position also approaches the subject vehicle as the lane departure angle of the subject vehicle with respect to the traveling lane increases.

3. A travel assist apparatus for assisting a driver to avoid a departure of a subject vehicle from a traveling lane, the travel assist apparatus comprising:
at least one processor configured to:
set the traveling lane based on a non-travelable area or a road marking to indicate a lane boundary;
change a threshold value such that the threshold value increases as a sum of a lane entering angle of an oncoming vehicle with respect to the traveling lane and a departure angle of the subject vehicle with respect to the traveling lane increases, wherein the lane departure angle of the subject vehicle with respect to the traveling lane is formed by the extending direction of the traveling lane and the traveling direction of the subject vehicle and the lane entering angle of oncoming vehicle with respect to the traveling lane is formed by the extending direction of the traveling lane and the traveling direction of the oncoming vehicle;
determine whether at least one of a distance between the subject vehicle and a boundary position of the lane boundary of the traveling lane or a time required until the subject vehicle arrives at the boundary position is not more than the threshold value; and
upon an affirmative determination, performing assist of warning or support so that the departure of the subject vehicle from the traveling lane is avoided.

4. A travel assist method for assisting a driver to avoid a departure of a subject vehicle from a traveling lane, the travel assist method comprising:
- setting, by at least one processor of a travel assist apparatus location at the subject vehicle, a traveling lane based on a non-travelable area or a road marking to indicate a lane boundary;
- changing, by the at least one processor, a boundary position of the traveling lane such that the boundary position approaches the subject vehicle as a lane entering angle of an oncoming vehicle with respect to the traveling lane and a lane departure angle of the subject vehicle with respect to the travelling lane increases,
- wherein the lane departure angle of the subject vehicle with respect to the traveling lane is formed by the extending direction of the traveling lane and the traveling direction of the subject vehicle and the lane entering angle of oncoming vehicle with respect to the traveling lane is formed by the extending direction of the traveling lane and the traveling direction of the oncoming vehicle;
- determining, by the at least one processor, whether at least one of a distance between the subject vehicle and the boundary position of the lane boundary or a time required until the subject vehicle arrives at the boundary position of the lane boundary is not more than a predetermined value; and
- upon an affirmative determination, performing assist of warning or support so that the departure of the subject vehicle from the traveling lane is avoided.

5. The travel assist method according to claim 4, wherein the boundary position of the traveling lane is changed such that the boundary position also approaches the subject vehicle as the departure angle of the subject vehicle with respect to the traveling lane increases.

6. A travel assist method for assisting a driver to avoid a departure of a subject vehicle from a traveling lane, the method comprising:
- setting, by at least one processor of a travel assist apparatus location at the subject vehicle, a traveling lane based on a non-travelable area or a road marking to indicate a lane boundary;
- changing, by the at least one processor, a threshold value such that the threshold value increases as a sum of a lane entering angle of an oncoming vehicle with respect to the traveling lane and a departure angle of the subject vehicle with respect to the traveling lane increases,
- wherein the lane departure angle of the subject vehicle with respect to the traveling lane is formed by the extending direction of the traveling lane and the traveling direction of the subject vehicle and the lane entering angle of oncoming vehicle with respect to the traveling lane is formed by the extending direction of the traveling lane and the traveling direction of the oncoming vehicle;
- determining whether at least one of a distance between the subject vehicle and a boundary position of the lane boundary of the traveling lane or a time required until the subject vehicle arrives at the boundary position of the lane boundary is not more than the threshold value; and
- upon an affirmative determination, performing assist of warning or support so that the departure of the subject vehicle from the traveling lane is avoided.

* * * * *